United States Patent [19]
Ma

[11] Patent Number: 5,765,525
[45] Date of Patent: Jun. 16, 1998

[54] INTAKE SYSTEM FOR AN INTERNAL COMBUSTION ENGINE

[75] Inventor: Thomas Tsoi-Hei Ma, South Woodham Ferrers, United Kingdom

[73] Assignee: Ford Global Technologies, Inc., Dearborn, Mich.

[21] Appl. No.: 860,685

[22] PCT Filed: Dec. 12, 1995

[86] PCT No.: PCT/GB95/02906

§ 371 Date: Sep. 15, 1997

§ 102(e) Date: Sep. 15, 1997

[87] PCT Pub. No.: WO96/18813

PCT Pub. Date: Jun. 20, 1996

[30] Foreign Application Priority Data

Dec. 15, 1994 [GB] United Kingdom ............ 9425312
Dec. 31, 1994 [GB] United Kingdom ............ 9426454

[51] Int. Cl.$^6$ .................. F02B 31/00; F02B 17/00; F02B 15/00
[52] U.S. Cl. .................. 123/308; 123/430; 123/432
[58] Field of Search .................. 123/308, 336, 123/432, 337, 568, 430

[56] References Cited

U.S. PATENT DOCUMENTS

| | | | |
|---|---|---|---|
| 4,119,064 | 10/1978 | Klomp | 123/308 |
| 4,256,062 | 3/1981 | Schafer | 123/520.07 |
| 4,930,468 | 6/1990 | Stockhausen | 123/188.007 |
| 5,273,014 | 12/1993 | Mitobe et al. | 123/336 |
| 5,335,634 | 8/1994 | Hashimoto et al. | 123/188.14 |
| 5,417,190 | 5/1995 | Ando et al. | 123/308 |
| 5,479,889 | 1/1996 | Sato et al. | 123/308 |
| 5,592,917 | 1/1997 | Kim | 123/308 |
| 5,603,301 | 2/1997 | Sakurai et al. | 123/430 |
| 5,634,445 | 6/1997 | Nishioka et al. | 123/306 |
| 5,640,941 | 6/1997 | Hazen et al. | 123/306 |

FOREIGN PATENT DOCUMENTS

| | | | |
|---|---|---|---|
| 62-623 | 1/1987 | Japan | 123/308 |
| 2-88324 | 12/1987 | Japan | 123/308 |
| 36-3147920 | 6/1988 | Japan | 123/308 |

*Primary Examiner*—Raymond A. Nelli
*Attorney, Agent, or Firm*—Donald A. Wilkinson

[57] ABSTRACT

An intake system is described for a spark ignition internal combustion engine having ports per cylinder, which may lead to a common intake valve or two separate intake valves. One of the intake ports (12) is shaped to direct a first flow tangentially near the outer periphery of the cylinder and the other intake port (20) is shaped to direct a second, swirling, flow towards the center of the cylinder. The second swirling flow has the same direction of rotation as that of the first flow. Injectors (28) are provided for introducing fuel into the second swirling flow thereby producing within the cylinder a charge that is radially stratified with a combustible mixture concentrated near the center of the cylinder. The flow rates through the two intake ports may be varied independently and the relative angular momentum of the two flows at the boundary between the two flows in the cylinder determines the degree of mixing between the two flows, such mixing being operative to decrease the degree of stratification of the charge within the cylinder.

22 Claims, 3 Drawing Sheets

INTAKE SYSTEM FOR AN INTERNAL COMBUSTION ENGINE

FIELD OF THE INVENTION

The present invention relates to an intake system for an internal combustion engine of the type having two intake ports per cylinder.

BACKGROUND OF THE INVENTION

Engines with two intake valves per cylinder are known that have one of the intake ports delivering the charge tangentially near the outer circumference of the cylinder and into which fuel is injected. During low load operation, port deactivation is used to close off the other intake port so that high swirl is produced in the combustion chamber by the first port. The injection of the fuel into the swirl port achieves good mixing and produces a homogeneous charge of fuel and air even at low flow rates. At higher speed and load, both the intake ports are active and the fuel injection system could be arranged such that the fuel is also well mixed in the combustion chamber.

U.S. Pat. No. 5,094,210 describes an engine with two intake valves per cylinder, having separate intake manifolds leading to respective first and second set of intake ports. The manifolds are separately throttled and fuel is supplied to both sets of intake ports, in the case of the first ports by a central fuelling system located at the plenum of the first intake manifold and in the case of the second ports by fuel injection into the individual ports. The design of the intake ports in this patent is such that when the charge is drawn equally through both ports, it tumbles within the combustion chamber, whereas when it is drawn through only one port the charge swirls within the combustion chamber. By varying the flows separately between the two sets of intake ports, a mixture of tumble and swirl is achieved.

The term swirl is used herein in its normally accepted sense to describe the charge motion when a vortex is created in the cylinder with its axis parallel to the cylinder axis. Tumble, on the other hand, describes the motion in which the charge rotates about an axis perpendicular to the cylinder axis and parallel to the plane containing the axes of the two intake valves.

The above system is suitable primarily for homogeneous charge but it is also possible to achieve some degree of charge stratification by fuelling the set of ports differently or by introducing exhaust gas recirculation (EGR) gases into one set of ports. Published data of an engine incorporating the above system (SAE 940449) shows the average lean air-fuel ratio (AFR) limit is in the region of 22:1 and the EGR limit is in the region of 22%. Such data is typical of most homogeneous lean burn engines and is a fair indication that only a small degree of charge stratification is achieved. It is not possible to exaggerate the degree of charge stratification further in this system and to operate at even higher average AFR or higher average EGR because mixing that occurs in the combustion chamber makes it difficult to keep different parts of the charge separate from each other.

Another known system has two intake valves per cylinder in which EGR is introduced through the second intake port while air and fuel mixture is introduced through the first intake port. The two intake ports are symmetrically designed for producing strong tumble and the system is aimed at creating charge stratification across the width of the cylinder with the different charge contents remaining directly under the respective intake ports thus substantially dividing the total charge into two half cylindrical charge volumes.

This system is not suitable, however, for stable ignition with a spark plug located at the center of the cylinder, as the spark occurs at the boundary between the two stratified charge volumes. Moreover, varying the flows separately between the two intake ports produces a skewed tumble motion which causes increased mixing and the stratification is quickly destroyed.

In all the above systems, during high load operation, although both intake ports are open and fully utilised to give maximum volumetric efficiency, care must be take to introduce fuel equally to both intake ports otherwise undesirable stratification and poor mixing may occur resulting in incomplete air utilisation and low engine performance. If the fuel system is designed to introduce fuel only through one of the intake ports for maximum charge stratification during low load operation, a second fuel system may be necessary to introduce fuel through the other intake port during high load operation to ensure homogeneous mixing. Alternatively, different mechanisms of mixing inside the combustion chamber for low and high load operations may be provided such that the fuel is stratified under low load conditions but is homogeneously mixed under high load conditions.

The above considerations also apply to engines with only one intake valve per cylinder that have two intake ports connected to the same intake valve. Such engines are known in which one of the intake ports is directed tangentially near the outer circumference of the cylinder and fuel is injected into this port. During low load operation, port deactivation is used to close off the other intake port so that high swirl is produced in the combustion chamber by the first port discharging predominantly through one side of the intake valve. The injection of the fuel into the swirl port achieves good mixing and produces a homogeneous charge of fuel and air even at low flow rates. At higher speed and load, both the intake ports are active to give the maximum volumetric efficiency and the fuel injection system could be arranged such that fuel is also well mixed in the combustion chamber to produce maximum engine power. Thus under all conditions, the mixture charge in the combustion chamber is designed to be homogeneous and any flow condition that might promote charge stratification is suppressed.

Co-pending GB Patent Application No. 9419944.5 describes an intake system for an internal combustion engine of the type having two intake ports connected to each intake valve in which, during low load operation, both the intake ports are active and charge stratification is achieved by injecting fuel only into the port that is directed towards the center of the cylinder, the other port that is directed tangentially to the cylinder carrying air containing no fuel or EGR gases. The degree of stratification created with this system is effective in supporting stable combustion with mixtures having an overall air to fuel ratio (AFR) which is significantly higher than is possible with a homogeneous mixture of uniformly lean AFR.

OBJECT OF THE INVENTION

The present invention seeks to provide an intake system for an internal combustion engine of the type having one or two intake valves per cylinder, in which charge stratification or homogeneous mixing may be progressively selected according to the engine load.

SUMMARY OF THE INVENTION

According to a first aspect of the present invention, there is provided an intake system for a spark ignition internal combustion engine of the type having two intake valves per cylinder, the intake system comprising two intake ports per cylinder, each associated with a respective intake valve, one of the intake ports being shaped to direct a first flow tangentially near the outer periphery of the cylinder and the other intake port being shaped to direct a second, swirling, flow towards the center of the cylinder, the second swirling flow having the same direction of rotation as that of the first flow, means for introducing fuel into the second swirling flow thereby producing within the cylinder a charge that is radially stratified with a combustible mixture concentrated near the center of the cylinder, and means for independently varying the flow rates through the two intake ports, in order to vary the degree of stratification of the charge within the cylinder.

This aspect of the invention differs from the prior art engines with two valves per cylinder in that the two intake ports are designed to create two different and independently controllable swirls with their axes parallel to the cylinder axis. The first outer swirl results from the interaction of the flow through the first intake port with the boundary of the cylinder while the second inner swirl is intentionally created by the internal design of the second intake port itself, which is for example a helical port or a port that comprises vanes for creating swirl in the intake charge inside the port. In this way, radial stratification can be achieved with a combustible mixture concentrated along the cylinder axis and air containing no fuel or EGR gases concentrated around the cylinder periphery. In this case, the two swirls are controlled to go round at substantially the same speed and do not mix to any extent with one another. The effect of the swirling ring of gases near the cylinder boundary will be to cause the inner vortex of combustible mixture to migrate to the center of the cylinder so that reliable ignition may be achieved with a centrally located spark plug.

When charge stratification is not required, the inner vortex will be controlled to have a higher angular momentum than the surrounding swirl. This will result in increased mixing between the two flows at their common boundary to produce a homogeneous charge.

An important feature of the invention not to be found in the prior art resides in the ability to control the stability of the swirling system inside the engine cylinder by controlling the relative momentum at the boundary between the inner vortex and the surrounding swirl.

In the absence of special provision in the second intake port to create swirl internally, there is no initial vortex induced in the flow from this port and this flow must subsequently be dragged into rotation by the shearing force cause by momentum exchange with the surrounding swirl. This condition is unstable and causes mixing and destroys stratification.

With the helical port for example serving as the second intake port, on the other hand, when in the region between the two flows the vortex from the helical port has substantially the same angular momentum as that of the surrounding swirl from the tangential port, the vortex is stable and the rotating charge from the helical port will remain intact and migrates towards the center of the cylinder, thus ensuring a stable and well defined stratification.

Any temperature difference between the two flow, as would be the case if hot EGR gases were fed into the surrounding swirl, could also cause instability because of density difference. The colder denser gases in the inner vortex may tend to migrate outwards and the hotter less dense gases in the surrounding swirl may tend to migrate inwards, again causing mixing and destroying stratification.

This effect can be neutralised in the present invention by inducing through the helical port a slower vortex of cold gases rotating within a relatively faster swirl of hot gases from the tangential port such that in the region between the two flows their angular momentums are substantially matched.

At high engine load when a homogeneous charge is required, the vortex from the helical port is controlled to rotate faster than the surrounding swirl from the tangential port. This vortex is once again unstable and tends to spread to the outer region of the cylinder thus promoting good mixing throughout the cylinder even though fuel is supplied only through the helical port. In this case, the bulk motion within the cylinder is still swirl, whereas in the prior art systems the bulk motion is tumble when both the intake ports are fully open.

Thus the invention automatically and controllably provides stable rotation for good stratification during low load operation on the one hand, and unstable rotation for good mixing during high load operation on the other hand. The former permits low load operation with a higher degree of charge stratification than the prior art systems giving even lower fuel consumption and lower $NO_x$ emissions. The latter permits full load operation with better air utilisation than the prior art systems giving higher engine performance without requiring a different or additional fuelling arrangement.

There are other methods of introducing a pre-spin inside the second intake port in addition to the methods described above. For example, part of flow drawn into the second intake port may be directed tangentially to the wall of the port to induce swirl inside the port. Alternatively, a free spinning impeller may be provided inside the port and this impeller may even be driven by an electric motor.

The means of introducing fuel into the inner vortex may comprise a central fuelling system (carburettor or CFI) for supplying a previously prepared mixture of fuel and air to the second intake ports or it may comprise a port injection system for injecting fuel separately into each of the second intake ports. As a further alternative, the fuel may be injected directly into the cylinder along the axis of the vortex discharged from the second intake port. The timing of the fuel injection into the intake port or into the combustion chamber may be controlled to occur near the end of the intake stroke or near the end of the compression stroke, respectively, to increase further the degree of charge stratification.

In accordance with a second aspect of the invention, there is provided an intake system for a spark ignition internal combustion engine of the type having one intake valve per cylinder, the intake system comprising two intake ports per cylinder, both the intake ports being connected to a common intake valve with each port discharging through adjacent sides of the intake valve, one of the intake ports being shaped to direct a first flow tangentially near the outer periphery of the cylinder and the other intake port being shaped to direct a second, swirling, flow towards the center of the cylinder, the second swirling flow having the same direction of rotation as that of the first flow, means for introducing fuel into the second swirling flow thereby producing within the cylinder a charge that is radially stratified with a combustible mixture concentrated near the center of the cylinder, and means for independently varying the flow rates through the two intake ports, the relative angular momentum of the two flows at the boundary between the two flows in the cylinder determining the degree of mixing between the two flows, which mixing is operative to decrease the degree of stratification of the charge within the cylinder.

In this second aspect, the invention differs from that in GB Patent Application No. 9425312.7 in that the two intake ports are designed to discharge through adjacent sides of a common intake valve and at the same time create two different and independently controllable swirls with their axis parallel to the cylinder axis. The first outer swirl results from the interaction of the flow through the first intake port discharging from one side of the intake valve with the boundary of the cylinder. The second inner swirl is intentionally created by the internal design of the second intake port discharging from the other side of the intake valve.

This internal swirl may be created by drawing part of the intake flow into the second intake port through a pipe directed tangentially to the intake port wall to induce swirl within the flow inside the port. In this way, radial stratification can be achieved with a combustible mixture concentrated along the cylinder axis and air containing no fuel or EGR gases concentrated around the cylinder periphery. In this case, the two swirls are controlled to go round at substantially the same speed and do not mix to any extent with one another. The effect of the swirling ring of gases near the cylinder boundary will be to cause the inner vortex of combustible mixture to migrate to the center of the cylinder so that reliable ignition may be achieved with a spark plug located near the center of the cylinder.

When charge stratification is not required, the inner vortex will be controlled to have a higher angular momentum than the surrounding swirl. This will result in increased mixing between the two flows at that common boundary to produce a homogeneous charge.

Thus the invention automatically and controllably provides good stratification suitable for low load operation and good mixing suitable for high load operation, the former giving lower fuel consumption and lower $NO_x$ emissions, the latter giving higher engine performance.

Preferably, the second intake port has a round cross-section extending as far as possible towards the valve stem of the intake valve such that the induced swirl within the port is preserved prior to discharging through its associated side of the intake valve.

BRIEF DESCRIPTION OF THE DRAWINGS

The invention will now be described further, by way of example, with reference to the accompanying drawings, in which.

DETAILED DESCRIPTION OF THE PREFERRED EMBODIMENTS

Figure 1:
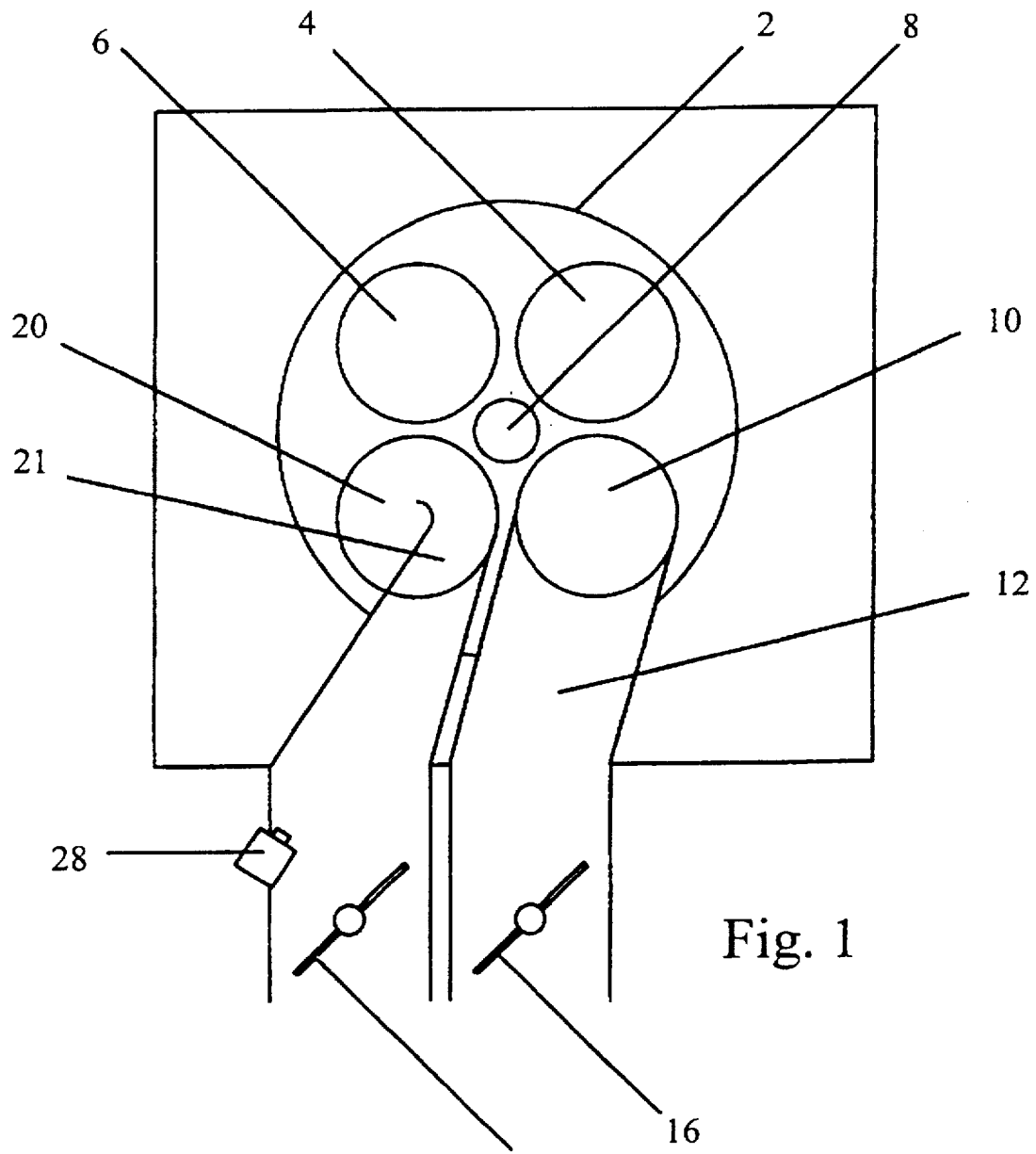
FIG. 1 is a schematic representation of an intake system of a first embodiment of the invention for an engine having two intake valves per cylinder.

FIG. 1 shows a cylinder 2 having two exhaust valves 4 and 6, a spark plug 8 and two intake valves 10 and 20. The first intake valve 10 has an intake port 12 with a flow control valve 16. The second intake valve 20 has a swirl port 21 with a separate flow control valve 26. Fuel is injected by means of the injector 28 only into the second intake port 21.

The first intake port 12 is designed to direct the intake charge tangentially into the combustion chamber. To this end a shroud or a deflector may be incorporated in the port 12 to assist in directing the flow of the charge onto the cylinder wall. The charge drawn in through the first intake port 12 thus swirls counter-clockwise as viewed in the combustion chamber while remaining close to the cylinder wall. The second intake port 21 is arranged to direct a charge into the center of the cylinder and this charge is also swirling counter-clockwise in the same direction as the path of the first charge drawn in through the first intake port 12. However the swirling motion of the second charge is not now created by the charge coming into contact with the cylinder boundary but by the internal design of the second intake port itself. In the case of FIG. 1, the swirling motion is the result of the shape of the intake port which directs the intake charge to one side only of the intake valve 20, this normally being referred to as a helical port.

Figure 2:
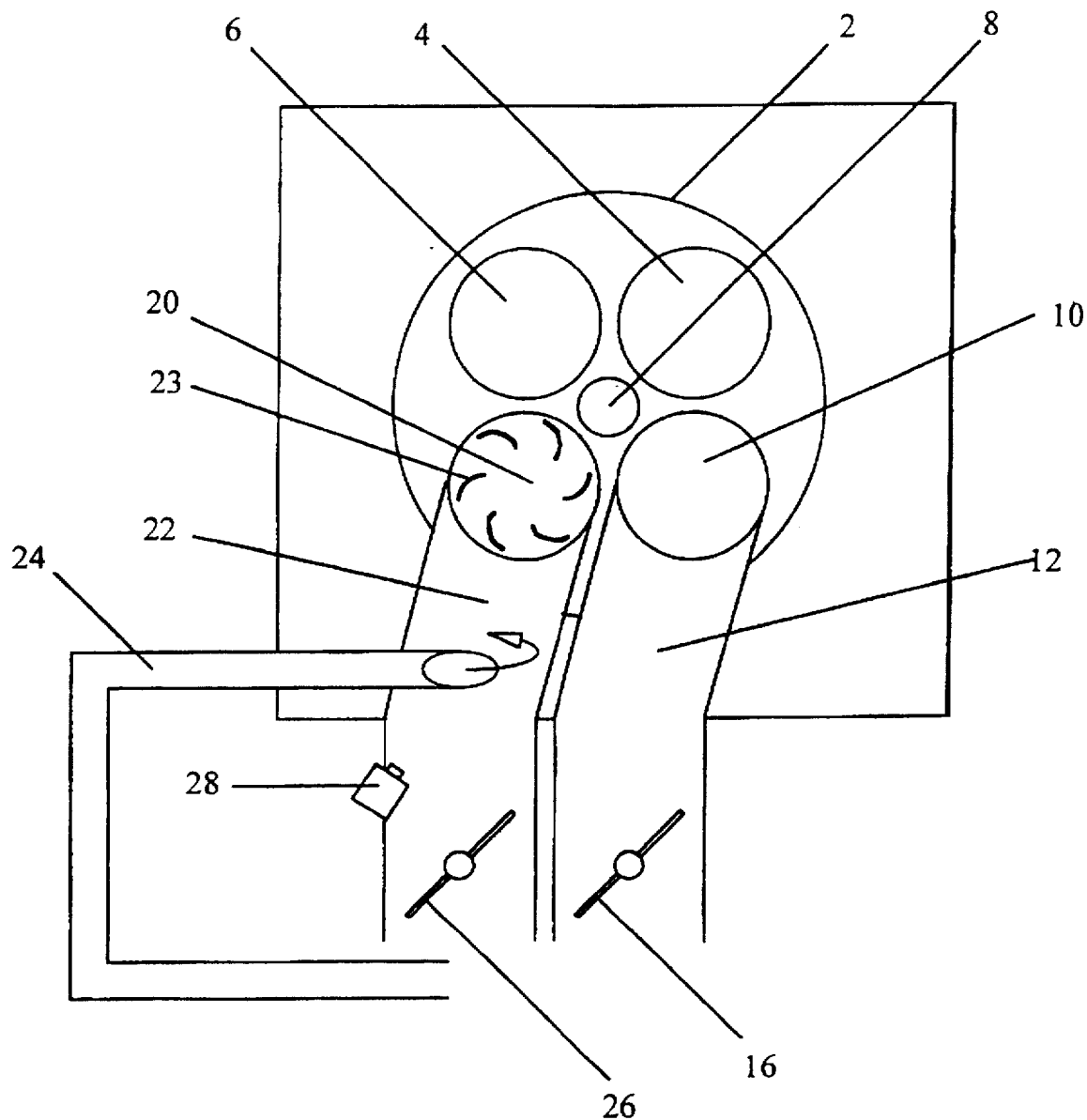
FIG. 2 is a view similar to that of FIG. 1 showing alternative embodiments of the invention for an engine having two intake valves per cylinder.

FIG. 2 shows alternatives to this design that will also create a swirl in the intake charge inside the port. The valve 20 has on the rear surface of its skirt vanes 23 shaped to make the charge swirl in the desired manner. Also, part of the second intake charge may be drawn in through a pipe 24 that is directed tangentially to the surface of the second intake port 22, this causing a helical flow of the charge inside the port before it reaches the intake valve 20.

In all the embodiments of the invention, the two intake valves at all times introduce two separate swirling charges with the charge from the second intake port lying inside the charge from the first intake port and rotating in the same direction. The rotational speed of the two charges at their mutual boundary may be varied by the flow control valves 16 and 26. If the two speeds are the same, then there is little mixing between the two flows and a radially stratified charge is achieved with the fuel lying at the center of the cylinder in the vicinity of the spark plug 8 where it can be readily ignited.

This condition is used under low load operation during which time air containing no fuel or exhaust gases are drawn in through the first intake port 12. The mixture drawn in through the second intake port 21 or 22 may now be stoichiometric even though the overall charge is highly diluted as a result of the charge stratification.

As the load is increased, more fuel and air are introduced through the second intake port but the swirling speed of the second intake charge is increased relative to that of the first intake charge so that mixing takes place at the boundary between the two charges to increase the radius within which the fuel is distributed progressively. The control of the swirling speeds of the two charges is effected by varying the two flow control valves 16 and 26 in synchronism with one another as a function of the engine load.

The intake system may have the same manifold branches leading to both intake ports 12 and 21 or separate branches leading to the intake ports from a common plenum. As a further alternative two separate plenums and separate sets of branches may be provided for each set of intake ports, each such manifold having its own intake flow control valve.

The fuelling system need not be a port injection fuelling system as illustrated in the two Figures, it is alternatively possible to use a carburettor, a central fuelling system connected to the second intake ports or to employ direct, in-cylinder, injection in which the fuel is aimed into the center of the combustion chamber. The timing of the fuel injection can also assist in improving the charge stratification.

Figure 3:
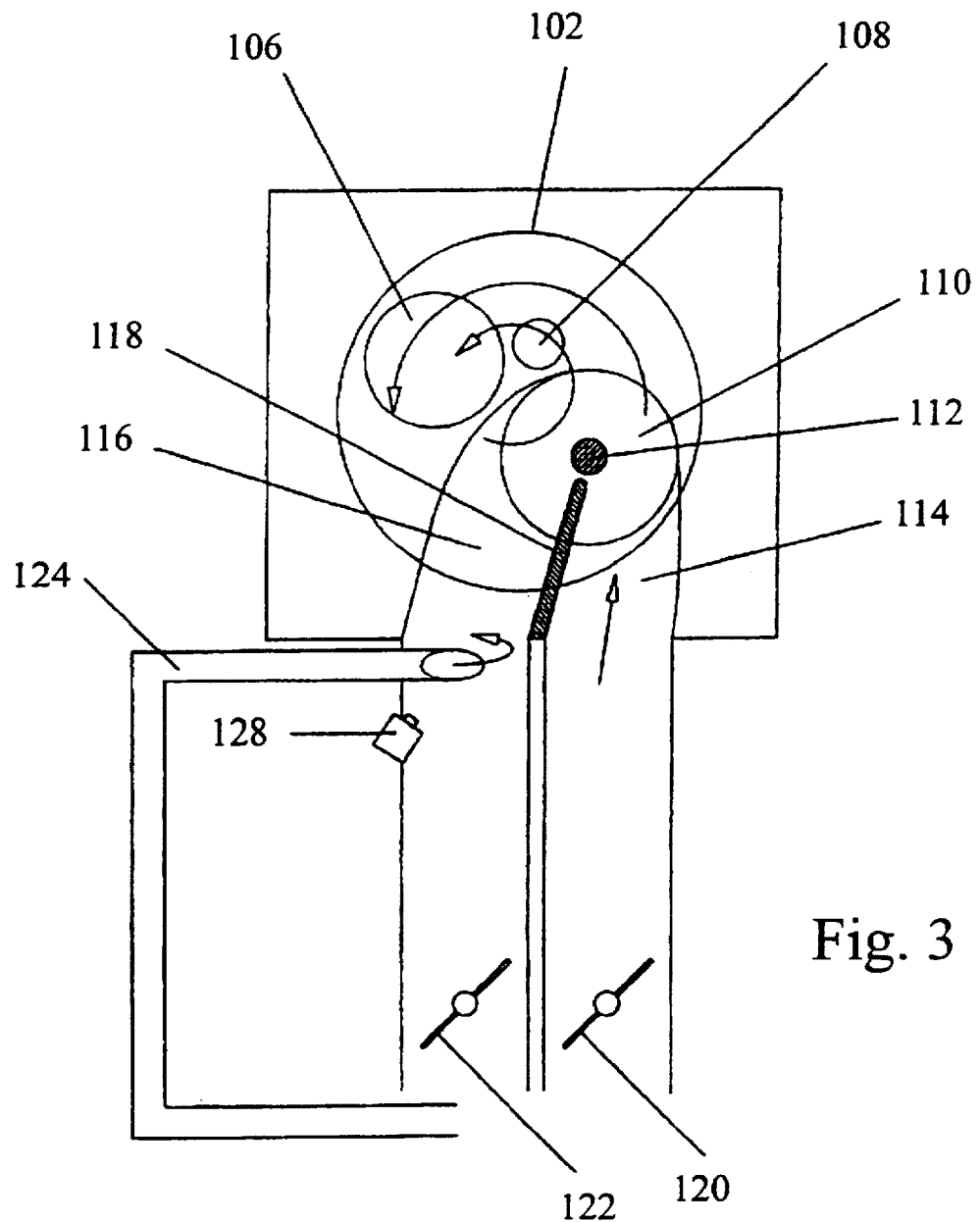
FIG. 3 is a schematic diagram showing an intake system for an engine having one intake valve per cylinder.

FIG. 3 shows an engine cylinder 102 having an exhaust valve 106, a spark plug 108 and an intake valve 110. Two intake ports 114, 116 with respective flow control valves 120, 122 are connected to the intake valve 110, each port discharging through adjacent sides of the intake valve 110. Fuel is injected by means of the fuel injector 128 only into the second intake port 116.

The first intake port 114 is designed to direct a first intake charge through one side of the intake valve 110 tangentially into the combustion chamber thus creating a swirl counter-clockwise as viewed in the combustion chamber while remaining close to the cylinder wall. The second intake port 116 is arranged to direct a second intake charge through the other side of the intake valve 110 into the center of the cylinder and this charge is also swirling counter-wise in the same direction as the path of the first charge drawn in through the first intake port 114. However, the swirling motion of the second charge is not now created by the charge coming into contact with the cylinder boundary but by the internal design of the second intake port 116 itself. This internal swirl is created by drawing part of the intake flow into the second intake port 116 through a pipe 124 directed tangentially to the intake port wall to induce a helical flow of the charge inside the port 116 before it reaches the intake valve 110.

In this embodiment, the two intake ports 114, 116 at all times introduce two separate swirling charges into the cylinder through adjacent sides of the intake valve 110 with the charge from the second intake port 116 lying inside the charge from the first intake port 114 and rotating in the same direction. The rotational speed of the two charges at their mutual boundary in the cylinder may be varied by the flow control valves 120, 122.

If the two speeds are the same, then there is little mixing between the two flows and a radially stratified charge is achieved with the fuel lying at the center of the cylinder in the vicinity of the spark plug 108 where it can be readily ignited.

This condition is used under low load operation during which time air containing no fuel or exhaust gases are drawn in through the first intake port 114. The mixture drawn in through the second intake port 116 may now be stoichiometric even though the overall charge within the cylinder is highly diluted as a result of the charge stratification.

As the load is increased, more fuel and air are introduced through the second intake port 116 but the swirling speed of the second intake charge is increased relative to that of the first intake charge so that mixing takes places at the boundary between the two charges to increase the radius within which the fuel is distributed progressively. The control of the swirling speeds of the two charges is effected by varying the two flow control valves 120, 122 in synchronism with one another as a function of the engine load.

Preferably the second intake port 116 has a round cross-section with the wall 118 separating the two intake ports extending as far as possible towards the valve stem 112 of the intake valve 110, such that the induced swirl within the port 116 is preserved prior to discharging through its associated side of the intake valve 1110.

The intake system may have the same manifold branches leading to both intake ports 114, 116 or separate branches leading to the intake ports from a common plenum. As a further alternative two separate plenums and separate sets of branches may be provided for each set of intake ports, each such manifold having its own intake flow control valve.

The fuelling system need not be a port injection fuelling system as illustrated, it being alternatively possible to use a carburettor, or a central fuelling system connected to the second intake port 116 or to employ direct, in-cylinder, fuel injection in which the fuel is aimed into the center of the combustion chamber.

I claim:

1. An intake system for a spark ignition internal combustion engine of the type having two intake valves (10,20) per cylinder, the intake system comprising two intake ports (12,21) per cylinder, each associated with a respective intake valve (10,20), one of the intake ports (12) being shaped to direct a first flow tangentially near the outer periphery of the cylinder (2) and the other intake port (21) being shaped to direct a second, swirling, flow towards the center of the cylinder, the second swirling flow having the same direction of rotation as that of the first flow, means (28) for introducing fuel into the second swirling flow thereby producing within the cylinder a charge that is radially stratified with a combustible mixture concentrated near the center of the cylinder, and means (16,26) for independently varying the flow rates through the two intake ports (12,21) in order to vary the degree of stratification of the charge within the cylinder.

2. An intake system as claimed in claim 1, wherein the second intake port (21) is a helical port for creating swirl in the intake charge inside the port.

3. An intake system as claimed in claim 1, wherein the second intake port (22) is provided with vanes (23) for creating swirl in the intake charge inside the port.

4. An intake system as claimed in claim 1, wherein the second intake port (22) is provided with vanes (23) fixed to the back of the intake valve head (20) for creating swirl in the intake charge as it leaves the port.

5. An intake system as claimed in claim 1, wherein the second intake port (22) is supplied by at least one duct (24) feeding part of the second intake flow tangentially near the circumference of the port wall to create swirl in the intake charge inside the port.

6. An intake system as claimed in claim 1, wherein the first and second intake ports of a bank of engine cylinders are connected by branches of an intake manifold to a common plenum, individual flow control valves (16,26) being provided to regulate the flow through each second intake port and a common flow control valve being provided to regulate the total flow drawn into the plenum.

7. An intake system as claimed in any of claim 1, wherein the first intake ports of a bank of engine cylinders are connected by branches of a first intake manifold to a first plenum, the second intake ports of the bank of cylinders are connected by branches of a second intake manifold to a second plenum, and separate flow control valves are provided to regulate the flows drawn into the respective plenums.

8. An intake system as claimed in claim 7, wherein the first and second flow control valves are ganged for operation in synchronisation according to engine load.

9. An intake system as claimed in claim 1, comprising means for introducing fuel into the second intake flow by supplying a premixed fuel and air mixture to the second intake port.

10. An intake system as claimed in claim 1, comprising means (28) for introducing fuel into the second intake flow by injecting fuel into the second intake port.

11. An intake system as claimed in claim 10, wherein the timing of the fuel injection is controlled to occur near the end of the intake stroke.

12. An intake system as claimed in claim 1, comprising means for introducing fuel into the second intake flow by direct fuel injection into the combustion chamber along the axis of the vortex discharged from the second intake port.

13. An intake system as claimed in claim 12, wherein the timing of the fuel injection is controlled to occur near the end of the compression stroke.

14. An intake system as claimed in claim 1, comprising means for metering the air flow through the second intake port and introducing fuel in proportion to the metered air flow.

15. An intake system as claimed in claim 14, wherein the metered air-fuel ratio in the second intake flow is stoichiometric.

16. An intake system as claimed in claim 1, wherein the gas flow through the first intake port contains no fuel.

17. An intake system as claimed in claim 16, wherein the gas flow through the first intake port comprises exhaust gases drawn from the exhaust system of the engine.

18. An intake system as claimed in claim 1, wherein the first intake port includes a shroud or flow deflector shaped to increase the swirl in the combustion chamber when the flow discharging from the port interacts with the boundary of the cylinder.

19. An intake system as claimed in claim 1, wherein the first intake port is a helical port.

20. An intake system for a spark ignition internal combustion engine of the type having one intake valve (110) per cylinder, the intake system comprising two intake ports (114,116) per cylinder (102), both the intake ports (114,116) being connected to a common intake valve (110) with each port discharging through adjacent sides of the intake valve (110), one of the intake ports (114) being shaped to direct a first flow tangentially near the outer periphery of the cylinder (102) and the other intake port (116) being shaped to direct a second, swirling, flow towards the center of the cylinder, the second swirling flow having the same direction of rotation as that of the first flow, means (128) for introducing fuel into the second swirling flow thereby producing within the cylinder a charge that is radially stratified with a combustible mixture concentrated near the center of the cylinder, and means (120,122) for independently varying the flow rates through the two intake ports, the relative angular momentum of the two flows at the boundary between the two flows in the cylinder determining the degree of mixing between the two flows, which mixing is operative to decrease the degree of stratification of the charge within the cylinder.

21. An intake system as claimed in claim 20, wherein the second intake port (116) is supplied by at least one duct (124) feeding part of the second intake flow tangentially near the circumference of the port wall to create swirl in the intake charge inside the port.

22. An intake system as claimed in claim 20, wherein the second intake port (116) has a round cross-section extending as far as possible towards the valve stem of the intake valve (110).

* * * * *